US008054839B2

(12) United States Patent
Cha et al.

(10) Patent No.: US 8,054,839 B2
(45) Date of Patent: Nov. 8, 2011

(54) APPARATUS AND METHOD OF PROCESSING STATEFUL ADDRESS AUTO-CONFIGURATION PROTOCOL IN IPV6 NETWORK

(75) Inventors: Hyun-Wook Cha, Suwon-si (KR); Pyung-Bin Lim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 205 days.

(21) Appl. No.: 12/398,506

(22) Filed: Mar. 5, 2009

(65) Prior Publication Data

US 2009/0225680 A1    Sep. 10, 2009

(30) Foreign Application Priority Data

Mar. 7, 2008    (KR) .................. 10-2008-0021506

(51) Int. Cl.
*H04L 12/28* (2006.01)
*H04L 12/56* (2006.01)

(52) U.S. Cl. .................. 370/395.5; 370/254; 370/390; 370/401; 709/245

(58) Field of Classification Search ............ 370/395.5, 370/401, 254, 390; 709/245–246
See application file for complete search history.

(56) References Cited

U.S. PATENT DOCUMENTS

| 6,912,205 | B2* | 6/2005 | Perlman et al. | 370/254 |
| 6,963,586 | B2* | 11/2005 | Henriksson et al. | 370/469 |
| 7,054,500 | B1* | 5/2006 | Lillevold | 382/260 |
| 7,457,253 | B2* | 11/2008 | Ronneke | 370/254 |
| 7,620,810 | B2* | 11/2009 | Vaarala et al. | 713/161 |
| 7,734,745 | B2* | 6/2010 | Gloe | 709/223 |
| 2006/0002356 | A1* | 1/2006 | Barany et al. | 370/338 |
| 2006/0036733 | A1* | 2/2006 | Fujimoto et al. | 709/225 |
| 2006/0159100 | A1* | 7/2006 | Droms et al. | 370/395.2 |
| 2006/0224841 | A1* | 10/2006 | Terai et al. | 711/154 |
| 2006/0271648 | A1* | 11/2006 | Seki | 709/220 |
| 2007/0223397 | A1* | 9/2007 | Gerasimov et al. | 370/254 |
| 2008/0162936 | A1* | 7/2008 | Haddad | 713/171 |
| 2009/0010191 | A1* | 1/2009 | Wentink | 370/311 |
| 2009/0161581 | A1* | 6/2009 | Kim | 370/254 |
| 2009/0225680 | A1* | 9/2009 | Cha et al. | 370/254 |

OTHER PUBLICATIONS

Request for Comments (RFC) 2461 "Neighbor Discovery for IP Version 6 (IPv6)"; Narten, T., Nordamrk, E., Simpson, W.; Internet Society; Dec. 1998.*
Request for Comment (rFC) "IPv6 Stateless Address Autoconfiguration"; Thomson, T., Narten, T.; Internet Society; Dec. 1998.*

* cited by examiner

Primary Examiner — Aung S Moe
Assistant Examiner — Benjamin H Elliott, IV
(74) Attorney, Agent, or Firm — Jefferson IP Law, LLP

(57) ABSTRACT

Apparatus and method for processing a stateful address auto-configuration protocol in an Internet Protocol version 6 (IPv6) network are provided. The method includes multicasting, at an IPv6 network, a Router Solicitation (RS) message, acquiring and managing flag values of a Router Advertisement (RA) message received from at least one router, and setting an operation mode of a Dynamic Host Configuration Protocol-for-IPv6 (DHCPv6) client according to the flag values of the RA message.

33 Claims, 9 Drawing Sheets

APPARATUS AND METHOD OF PROCESSING STATEFUL ADDRESS AUTO-CONFIGURATION PROTOCOL IN IPV6 NETWORK

PRIORITY

This application claims the benefit under 35 U.S.C. §119 (a) of a Korean patent application filed on Mar. 7, 2008 in the Korean Intellectual Property Office and assigned Serial No. 10-2008-0021506, the entire disclosure of which is hereby incorporated by reference.

BACKGROUND OF THE INVENTION

1. Field of the Invention

The present invention relates to an apparatus and method for processing a stateful address auto-configuration protocol in an Internet Protocol version 6 (IPv6) network. More particularly, the present invention relates to an apparatus and method for processing a stateful address configuration protocol in an IPv6 network wherein, resources of the IPv6 host and loads on a network may be efficiently controlled by determining an operation mode of a Dynamic Host Configuration Protocol-for-IPv6 (DHCPv6) client according to an address assignment protocol.

2. Description of the Related Art

The Internet Protocol version 4 (IPv4) currently exhausts its IP addresses due to an increasing number of network subscribers. The Internet Protocol version 6 (IPv6) was developed in order to overcome the address exhaustion and other drawbacks of the IPv4.

In general, the IPv4 is a 32-bit address system consisting of 4.2 billion IP addresses whereas the IPv6 is a 128-bit address system consisting of $3.4 \times 10^{38}$ addresses. Thus, the IPv6 can support more subscribers than the IPv4.

Since the IPv6 has a 128-bit address length, the IPv6 can support increased growth in the use of the network (Internet). The IPv6 also has a plurality of advantages such as accelerated network speed, high-quality services through recognition of specific packets, packet source authentication through an expansion of headers, data integrity and improved security.

An IPv6 address auto-configuration is generally classified into a stateful address configuration and a stateless address configuration.

The stateful address configuration is a method for configuring IPv6 addresses and other pieces of configuration information according to a Dynamic Host Configuration Protocol (DHCP). Similarly to the IPv4-IPv6 address system, an IPv6 host needs a DHCP-for-IPv6 (DHCPv6) server that acquires information necessary for the stateful address configuration based on a client/server structure.

The stateless address configuration protocol is a method in which an IPv6 host required for IPv6 address configuration preferentially acquires link local addresses of routers using a neighbor discovery mechanism and multicasts a Router Solicitation (RS) message to the entire IPv6 addresses.

When the RS message is received, a router transmits the prefix of all IPv6 addresses on a Router Advertisement (RA) message to the IPv6 host, which then generates an IPv6 address by combining the acquired prefix of the IPv6 addresses and an interface identifier.

Technical details on a method in which the IPv6 host configures the IPv6 address in the IPv6 network are described in the "Request for Comments (RFC) 2462 (IPv6 Stateless Address Auto configuration)."

The "RFC 2462" describes stateless IPv6 address auto-configuration using an RA message, which is used in IPv6 protocol stacks of most operating systems.

For example, the "RFC 2462" describes a method for operating a stateful address configuration protocol or a DHCPv6 client using a flag field, that is, Managed/Other (M/O) flags of an RA message. A brief description will be given below of the "RFC 2462".

When an RA message is received, an IPv6 host required for stateful address configuration stores M and O flag values set in the flag field of the RA message as a Managed Flag value and an OtherConfig Flag value, respectively. When the Managed Flag value changes from false (0) to true (1), the IPv6 host determines whether the DHCPv6 client is running. If the DHCPv6 client is not running, the IPv6 host acquires an IPv6 address and other pieces of configuration information from a DHCPv6 server by activating the DHCPv6 client.

In the meantime, when the Managed Flag value changes from true (1) to false (0), the IPv6 host does not affect an operation of the DHCPv6 client. In addition, when the Managed Flag value does not change, there is no change in the operation of the DHCPv6.

Likewise, when the OtherConfig Flag value changes from false (0) to true (1), the IPv6 host determines whether the DHCPv6 client is running. If the DHCPv6 client is not running, the IPv6 host acquires the other pieces of configuration information except for the IPv6 address from the DHCPv6 server by activating the DHCPv6 client. If the OtherConfig Flag value changes from true (1) to false (0) or is the same, there is no change in the operation of the DHCPv6 client.

According to the stateful address configuration protocol using the M/O flag values of the RA message, described in the "RFC 2462," a network operator can dynamically activate the DHCPv6 client of the IPv6 host by setting the M/O flag values of the RA message.

However, when the stateful address configuration protocol has to be changed into the stateless address configuration protocol due to, for example, the overload of the DHCPv6 server, that is, when a DHCPv6 service has to be stopped or the IPv6 host moves to another network without a DHCPv6 service, there are no methods for dynamically controlling the operation of the DHCPv6 client.

For example, in a state where the stateful address configuration protocol is set as the IPv6 network (Managed Flag=true, OtherConfig Flag=true), the IPv6 host acquires an IPv6 address and other pieces of configuration information from the DHCPv6 server by activating the DHCPv6 client. Since the IPv6 host continues to run the DHCPv6 client even if the protocol of the IPv6 network changes into the stateless address configuration protocol (Managed Flag=false, OtherConfig Flag=false), resources of the IPv6 host and unnecessary DHCPv6 messages lower efficiency in terms of network bandwidth.

However, an existing operating system, such as Windows Vista® and Windows 2008® of Microsoft, operates unlike the description of the "RFC 2462." Specifically, when the Managed Flag value changes from true (1) to false (0) or when the OtherConfig Flag value changes from true (1) to false (0) (Managed Flag=false (0)), the IPv6 host returns an assigned IPv6 address and stops running the DHCPv6 client.

While the operation of the existing operating system is based on a structure in which the IPv6 host is connected to one access network, the IPv6 host can generally access one or more access networks via one switch due to network expansion. Accordingly, the IPv6 host has a problem associated with operating the DHCPv6 client.

FIG. 1 is a block diagram illustrating a conventional IPv6 network, and

FIG. 2 is a conventional flow diagram illustrating an IPv6 address configuration method in which an IPv6 host configures an IPv6 address in the IPv6 network.

Referring to FIGS. 1 and 2, a description will be made of a network environment in which one or more IPv6 hosts 10 (10-1, 10-2, 10-3) can access a plurality of networks having different network protocols.

A first access network ISP A uses a stateful address configuration protocol, and a second access network ISP B (i.e., a local area network) uses a stateless address configuration protocol.

Since the first access network ISP A uses the stateful address configuration protocol, a first router 20-1 transmits a first RA message to the IPv6 hosts 10 via a switch 30 in step S10. In the first RA message, an M/O flag value is set to 1/x (x=don't care).

When the first RA message is received, since an M flag value is true (1), each of the IPv6 hosts 10 activates a DHCPv6 client to access a DHCPv6 server and receives IPv6 address information assigned therefrom in step S11.

The second router 20-2 is delegated with a prefix PB::/48 from the access network ISP B, and transmits a second RA message to the IPv6 hosts 10 via the switch 30 in step S12. Here, the second RA message includes prefix information PB:SLA::/64, which is used by each of the IPv6 hosts 10 to configure an IPv6 address.

Since the second access network (local area network) ISP B uses the stateless address configuration protocol, the second router 20-2 transmits the RA message by setting M/O flag values to 0/x (x=don't care) and setting prefix information in an option field.

When the second RA message is received, each of the IPv6 hosts 10 stops running the DHCPv6 client since the M flag value is zero (0) and generates an IPv6 address by combining the prefix information with an interface identifier in step S13. Here, each of the hosts 10 returns the IPv6 address, which was assigned from the DHCPv6 server.

The first router 20-1 periodically transmits the first RA message to the IPv6 hosts 10 in step S14.

When the first RA message is received, each of the IPv6 hosts 10 activates (restarts) the DHCPv6 client to receive an IPv6 address assigned again from the DHCPv6 server in step S15.

Since the first router 20-1 and the second router 20-2 periodically transmit the first RA message and the second RA message, respectively, each of the IPv6 hosts 10 receives an alternating first RA message and second RA message.

Accordingly, each of the IPv6 hosts 10 activates the DHCPv6 client to receive an IPv6 address assigned from the DHCPv6 server when the RA message with the M flag value set to one (1) is received and stops running the DHCPv6 client. Each of the IPv6 hosts 10 returns the assigned IPv6 address when the second RA message with the M flag value set to zero (0) is received. Since the alternating first RA message and second RA message are received, the IPv6 host 10 alternately performs a process of activating the DHCPv6 client to be assigned with the IPv6 address, stops running the DHCPv6 client and returns the IPv6 address.

As a result, the resources of the IPv6 host 10 are consumed and the DHCPv6 server and the network are subjected to an unnecessary load. In addition, since the IPv6 host 10 returns the IPv6 address, assigned from the DHCPv6 server of the access network using the stateful address configuration protocol, when the RA message with the M flag set to zero (0) is received, the IPv6 host 10 cannot stably access the network (Internet) through the access network using the stateful address configuration protocol.

Therefore a need exists for an apparatus and method for minimizing resources of an IPv6 host and minimizing loads in a network while processing a stateful address autoconfiguration protocol in an IPv6 host network.

SUMMARY OF THE INVENTION

An aspect of the present invention is to address at least the above-mentioned problems and/or disadvantages and to provide at least the advantages described below. Accordingly, an aspect of the present invention is to provide an apparatus and method for processing a stateful address auto-configuration protocol in an Internet Protocol version 6 (IPv6) network, in which resources of an IPv6 host and loads on a network may be minimized by determining an operation mode of a Dynamic Host Configuration Protocol-for-IPv6 (DHCPv6) client according to an address assignment protocol as intended by a network operator.

Another aspect of the present invention is to provide an apparatus and method for processing a stateful address auto-configuration protocol in an IPv6 network, in which loads on a DHCPv6 server and an access network may be minimized by managing flag values of Router Advertisement (RA) messages according to routers when accessing one or more access networks of different network protocols in which a process of accessing the DHCPv6 server by frequently stopping and reactivating the DHCPv6 client is not repeated.

A further aspect of the present invention is to provide an apparatus and method for processing a stateful address auto-configuration protocol in an IPv6 network in which the IPv6 host of the IPv6 network may stably access the network (Internet) via an access network requiring the stateful address configuration protocol by controlling the operation mode of the DHCPv6 client based on flag values of the RA messages received from a plurality of routers.

In accordance with an aspect of the present invention, a method for processing a stateful address auto-configuration protocol in an IPv6 network is provided. The method includes multicasting, at an IPv6 host, a Router Solicitation (RS) message, acquiring and managing flag values of a Router Advertisement (RA) message received from at least one router, and setting an operation mode of a Dynamic Host Configuration Protocol-for-IPv6 (DHCPv6) client according to the flag values of the RA message.

The acquiring and managing of the flag values may acquire an M flag value or an O flag value of the RA message received from the router and managing the RA message according to the router, or may manage the M flag value or the O flag value of the RA message received from the router according to a link local address of the router.

The acquiring and managing of the flag values may include acquiring an M flag value or an O flag value of the RA message, increasing a first flag count if the M flag value is true, and increasing a second flag count if the O flag value is true.

The acquiring and managing of the flag values may include acquiring a previous M flag value of a previous RA message received from the router, decreasing the first flag count if the previous M flag value is true and the M flag value is false, and increasing the first flag count if the previous M flag value is false and the M flag value is true.

The acquiring and managing of the flag values may include acquiring a previous O flag value of a previous RA message received from the router, and increasing the second flag count if the previous O flag value is false and the O flag value is true.

The acquiring and managing of the flag values may include constructing a flag table including entries according to the router, if the M flag value or the O flag value of the RA message is true, determining whether an entry corresponding to the router is present in the flag table, if the entry corresponding to the router is not present, adding the corresponding entry to the flag table, and if the entry corresponding to the router is present, processing a first flag count or a second flag count based on information of the corresponding entry and the M flag value or the O flag value of the RA message.

The processing of the first flag count or the second flag count may include decreasing the first flag count if an M flag value of the corresponding entry is true and the M flag value of the RA message is true, increasing the first flag count if the M flag value of the corresponding entry is false and the M flag value of the RA message is true, and increasing the second flag count if an O flag value of the corresponding entry is false and the O flag value of the RA message is true.

The method may further include, if the M flag value or the O flag value of the RA message is true, refreshing the corresponding entry using the true M flag value or the O flag value, and if the M flag value or the O flag value of the RA message is false, canceling the corresponding entry.

The flag table may be constructed in entry units, which include at least one field according to the router selected from a group comprising a link local address, an M flag value, an O flag value, a fresh flag, an expiration count and a starting address point variable of a next entry.

The method may further include multicasting, at the IPv6 host, the RS message by activating the timer, setting up the fresh flag if the RA message is received from a preset router before timeout, increasing the expiration count flag if the RA message is not received from the preset router before timeout, and canceling the entry corresponding to the preset router if the expiration count exceeds a maximum expiration count.

The operation mode of the DHCPv6 client may be set, according to the M flag value or the O flag value of the RA message, as one of a first operation mode for acquiring an IPv6 address and configuration information from a DHCPv6 server, a second operation mode for acquiring the configuration information except for the IPv6 address from the DHCPv6 server and a third operation mode for stopping running the DHCPv6 client.

The setting of the operation mode of a DHCPv6 client may include verifying the first flag count and the second flag count, setting the first operation mode if the first flag count is greater than 1, setting the second operation mode if the first flag count is 0 and the second flag count is greater than 1, and setting the third operation mode if both the first flag count and the second flag count are 0.

In accordance with another aspect of the present invention, a method for processing a stateful address auto-configuration protocol in an IPv6 network is provided. The method includes acquiring, at an IPv6 host, an M flag value or an O flag value of a Router Advertisement (RA) message received from a router, processing a first flag count or a second flag count based on the M flag value or the O flag value of the RA message and a previous M flag value and an O flag value of a previous RA message from the router, and setting an operation mode of a DHCPv6 based on the first flag count or the second flag count.

The processing the first flag count or the second flag count may include decreasing the first flag count if the previous M flag value is true and the M flag value of the RA message is true, increasing the first flag count if the previous M flag value is false and the M flag value of the RA message is true, and increasing the second flag count if the previous O flag value is false and the O flag value of the RA message is true.

The processing the first flag count or the second flag count may include constructing a flag table including entry units of the router, which include at least one field of the router selected from the group including a link local address, an M flag value, an O flag value, a fresh flag, an expiration count and a starting address point variable of a next entry, when the RA message is received, determining whether an entry having a link local address corresponding to a source address is present in the flag table, if the entry corresponding to the source address is not present and if the M flag value or the O flag value of the RA message is true, adding a new entry, and if the entry corresponding to the source address is present, comparing the previous M flag value or the O flag value of the entry with the M flag value or the O flag value of the RA message.

The comparing of the previous M flag value or the O flag value of the entry with the M flag value or the O flag value of the RA message may include decreasing the first flag count if the previous M flag value is true and the M flag value is false, increasing the second flag count and refreshing the M flag value and the O flag value in the entry if the O flag value is true, canceling the entry if the O flag value is false.

The method may further include increasing the second flag count and refreshing the M flag value and the O flag value in the entry if the previous O flag value is false and the O flag value is true, and increasing the first flag count and refreshing the M flag value and the O flag value in the entry if the M flag value is true and the M flag value is true.

The method further include refreshing the entry and setting up the fresh flag if the M flag value or the O flag value of the RA message is true, canceling the entry if both the previous M flag value and the previous O flag value are false, increasing the expiration count if the RA message, in response to a Router Solicitation (RS) message transmitted by operation of a timer, is not received before timeout, and canceling the entry if the expiration count exceeds a maximum expiration count.

The method further include canceling the flag table if a link of the IPv6 host is disconnected or terminated, and constructing the flag table according to the M flag value and the O flag value of the RA message received from the router if the link is reconnected.

The setting of the operation mode of a DHCPv6 may include verifying the first flag count and the second flag count, setting the operation mode a first operation mode if the first flag count is greater than 1, the first operation mode acquiring an IPv6 address and configuration information from a DHCPv6 server, setting the operation mode a second operation mode if the first flag count is 0 and the second flag count is greater than 1, the second operation mode acquiring the configuration information except for the IPv6 address from the DHCPv6 server, and setting the operation mode a third operation mode if both the first flag count and the second flag count are 0, the third operation mode stops running the DHCPv6 client.

According to a further aspect of the present invention, the IPv6 network may include at least one router providing a Router Advertisement (RA) message with an M flag value or an O flag value set according to a network protocol, and at least one host acquiring the M flag value or the O flag value of the RA message received from the router, managing the M flag value or the O flag value according to the router, and determining a stateful address configuration operation mode based on the M flag value or the O flag value of the router.

The host may construct a flag table including entries of the router and manages the M flag value or the O flag value of the RA message according to the router.

The flag table may be constructed in entry units according to the router, which include at least one field selected from a group including a link local address, an M flag value, an O flag value, a fresh flag, an expiration count and a starting address point variable of a next entry.

The router may determine whether an entry corresponding to the router is present in the flag table, if the M flag value or the O flag value of the RA message is true, if the entry corresponding to the router is not present, the router may add the corresponding entry to the flag table, and if the entry corresponding to the router is present, the router may process a first flag count or a second flag count based on information on the corresponding entry and the M flag value or the O flag value of the RA message.

The router may decrease the first flag count if an M flag value of the corresponding entry is true and the M flag value of the RA message is true, the router may increase the first flag count if the M flag value of the corresponding entry is false and the M flag value of the RA message is true, and the router may increase the second flag count if an O flag value of the corresponding entry is false and the O flag value of the RA message is true.

The host may set the stateful address configuration operation mode as a first operation mode if the first flag count is greater than 1, the first operation mode acquiring an IPv6 address and configuration information from a DHCPv6 server, as a second operation mode if the first flag count is 0 and the second flag count is greater than 1, the second operation mode acquiring the configuration information except for the IPv6 address from the DHCPv6 server, and as a third operation mode if both the first flag count and the second flag count are 0, the third operation mode stops running the DHCPv6 client.

The host may multicast the RS message by activating a timer, set up the fresh flag if the RA message is received from the router before timeout, increase an expiration count flag if the RA message is not received from the router before timeout, and cancel the entry of the router if the expiration count exceeds a maximum expiration count.

In accordance with still another aspect of the present invention, the IPv6 host may include a message transmitter for transmitting a Router Solicitation (RS) message to a network and for receiving a Router Advertisement (RA) message from at least one router, a Dynamic Host Configuration Protocol-for-IPv6 (DHCPv6) client for acquiring address information or for setting information from a DHCPv6 server according to a stateful address configuration operation mode, a stateful address configuration protocol processor acquiring an M flag value or an O flag value of the RA message received from the router, managing the M flag value or the O flag value according to the router using a flag table, and determining an operation mode of the DHCPv6 client based on a previous M flag value and a previous O flag value of the router in the flag table and M and O flag values of the RA message, and a memory for storing the flag table.

The stateful address configuration protocol processor may include an operation mode processor determining the operation mode based on the previous M flag value and the previous O flag value in the flag table and the M flag value and the flag value of the RA message.

The operation mode processor may increase the first flag count if the previous M flag value is false and the M flag value of the RA message is true, decreases the first flag count if the previous M flag value is true and the M flag value of the RA message is false, and increases the second flag count if the previous O flag value is false and the O flag value of the RA message true.

The operation mode processor may verify the first flag count and the second flag count, set the operation mode as a first operation mode if the first flag count is greater than 1, the first operation mode acquiring an IPv6 address and configuration information from a DHCPv6 server, set the operation mode as a second operation mode if the first flag count is 0 and the second flag count is greater than 1, the second operation mode acquiring the configuration information except for the IPv6 address from the DHCPv6 server, and set the operation mode as a third operation mode if both the first flag count and the second flag count are 0, the third operation mode stops running the DHCPv6 client.

The flag table may be constructed in entry units according to the router, which include at least one field selected from a group including a link local address, an M flag value, an O flag value, a fresh flag, an expiration count and a starting address point variable of a next entry.

The operation mode processor may add an entry corresponding to the router to the flag table if an entry corresponding to the source address of the RA message is not present in the flag table and the M flag value or the O flag value is true.

The operation mode processor may refresh the M flag value or the O flag value of the RA message in a field corresponding to the flag table and set up the fresh flag if the entry corresponding to the source address of the RA message is present in the flag table.

The operation mode processor may periodically transmit the RS message to the router or increase the expiration count if the RA message is not received before timeout, when the previous M flag value and the previous O flag value are 0, and cancel the corresponding entry if the expiration count exceeds a maximum expiration count.

The stateful address configuration protocol processor may include a timer processor activating a timer that allows the IPv6 host to periodically transmit the RS message.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

An exemplary apparatus and a method of processing a stateful address auto-configuration protocol in an IPv6 network of the present invention will now be described hereinafter with reference to the accompanying drawings.

Figure 1:
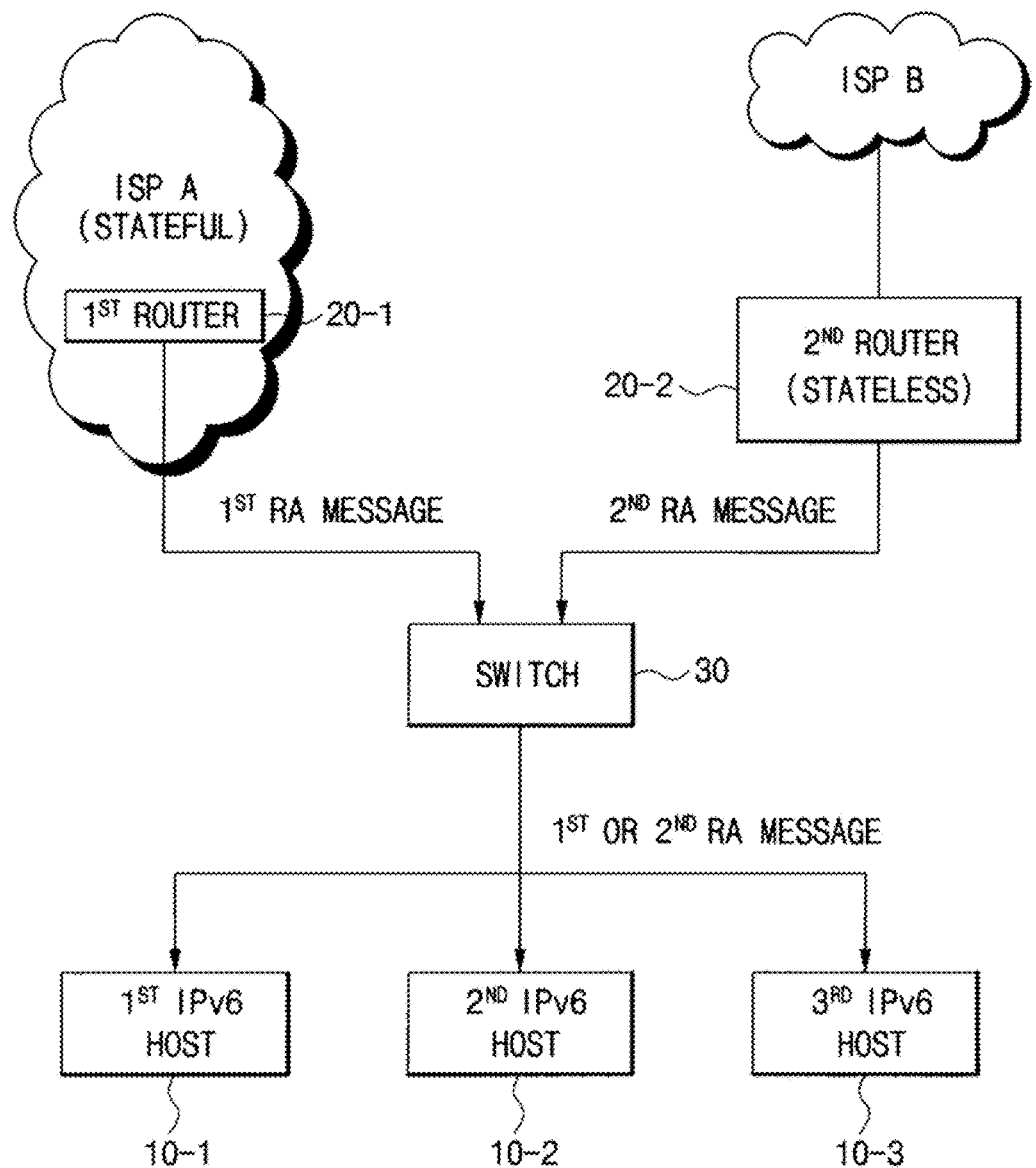
FIG. 1 is a block diagram illustrating a conventional IPv6 network.
Figure 2:
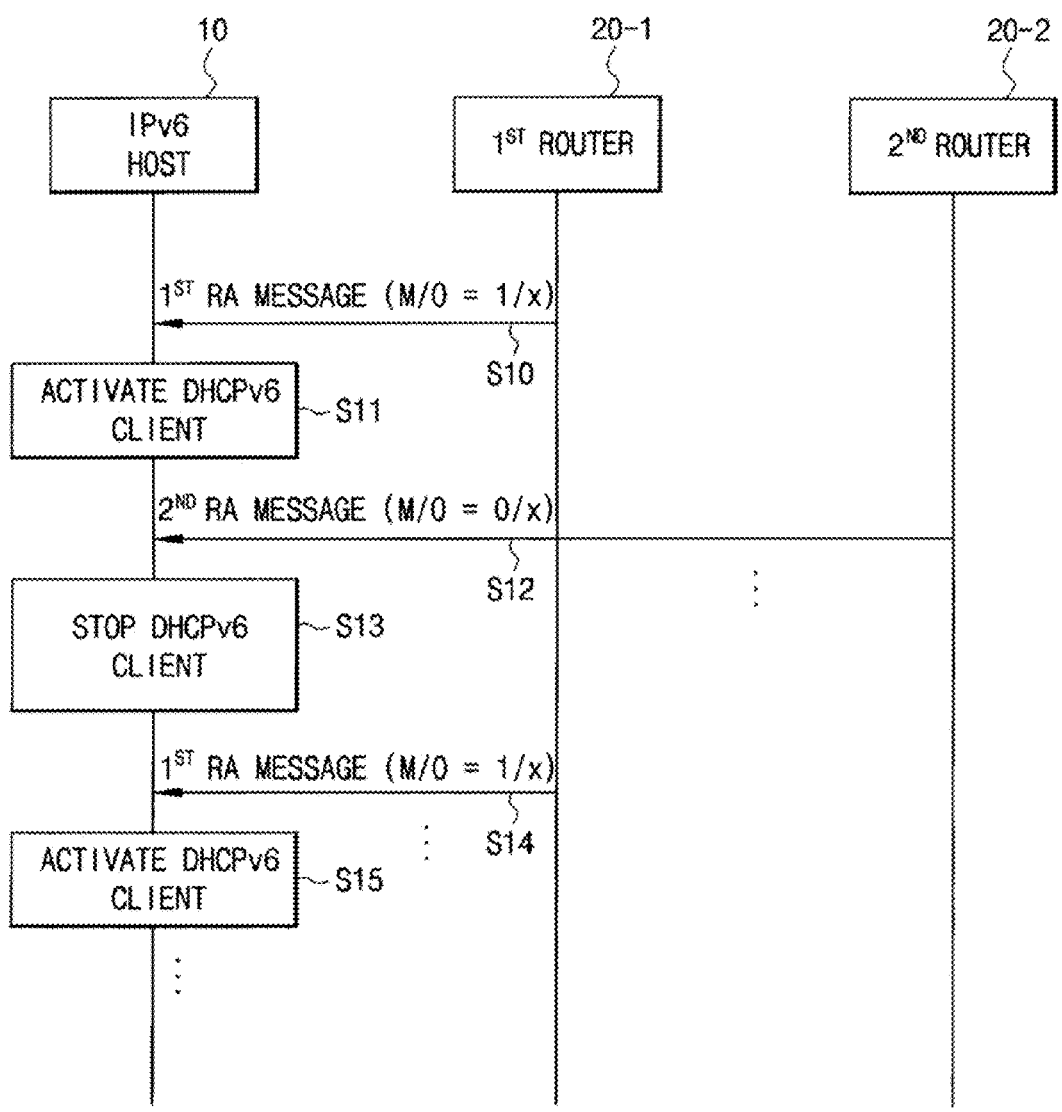
FIG. 2 is a conventional flow diagram illustrating an IPv6 address configuration method in which an IPv6 host configures an IPv6 address in the IPv6 network.
Figure 3:
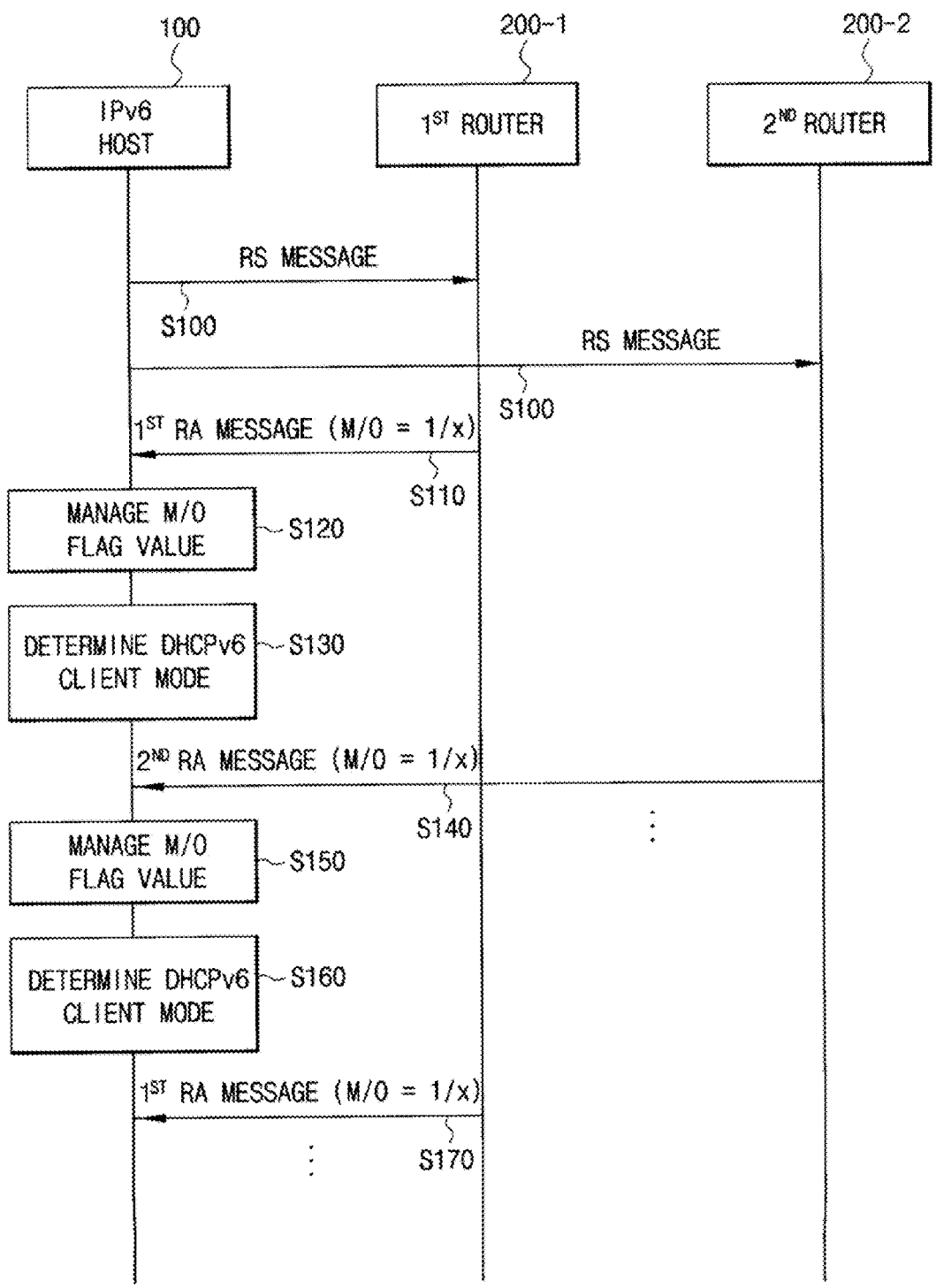
FIG. 3 is a flow diagram illustrating a method in which an IPv6 host processes a stateful address configuration protocol in an IPv6 network according to an exemplary embodiment of the present invention.

FIG. 3 is a flow diagram illustrating a method in which an IPv6 host processes a stateful address configuration protocol in an IPv6 network according to an exemplary embodiment of the present invention.

In the following description, as illustrated in FIG. 3, it shall be assumed that a first router 200-1 performs services for an access network using a stateful address auto-configuration protocol and a second router 200-2 performs services for an access network or a local area network using a stateless address configuration protocol.

In the IPv6 network according to an exemplary embodiment of the present invention, an IPv6 host 100 required to create an IPv6 global address multicasts a Router Solicitation (RS) message in step S100.

When the RS message is received, the first router 200-1 verifies a stateful address configuration protocol according to the network protocol of the access network and then transmits a first Router Advertisement (RA) message to the IPv6 host 100 in step S110. Since the network protocol is the stateful address configuration protocol, the first router 200-1 sets the M/O flag values of the flag field of the first RA message to 1/x (x=don't care).

The IPv6 host 100 manages the M/O flag values according to routers, which transmitted the first RA message, by verifying the M/O flag values of the received RA message in step S120.

The IPv6 host 100 sets the operation mode of the DHCPv6 client 110 based on the M/O flag values of a previous RA message and the M/O flag values of a currently-received RA message of the router 200-1, which transmitted the currently-received RA message in step S130. Specifically, the IPv6 host 100 counts the M/O flag values of the received RA message to determine an operation mode of the DHCPv6 client based on an M flag count and an O flag count.

The IPv6 host 100 determines the operation mode of the DHCPv6 client 110 and operates (activates or stops) the DHCPv6 client based on the determined operation mode in step S130.

The operation mode of the DHCPv6 client of the IPv6 host 100 may be generally classified into a stateful operation mode, a stateless operation mode and an inactive operation mode.

The stateful operation mode is an operation mode in which an IPv6 address and other pieces of configuration information (e.g., an IPv6 address of a Domain Name System (DNS) server, an IPv6 address of a domain name, an IPv6 address of a Session Initiation Protocol (SIP) server and the like) are acquired from the DHCPv6 server and are automatically configured.

The stateless operation mode is an operation mode in which the other pieces of configuration information except for the IPv6 address are acquired from the DHCPv6 server and are automatically configured. Here, when an IPv6 address acquired in the stateful operation mode is present, the acquired IPv6 address is returned.

The inactive operation mode is an operation mode in which the IPv6 host 100 stops running the DHCPv6 client 110 and an acquired IPv6 address is returned.

The second router 200-2 transmits a second RA message, with M/O flag values set to 0/x, to the IPv6 host 100 since the local area network uses the stateless address configuration protocol in step S140.

The IPv6 host 100 manages the M/O flag values according to routers by verifying the M/O flag values of the second RA message in step S150.

The IPv6 host 200 counts the M/O flag values of the RA messages received from the first router 200-1 and the second router 200-2, and determines the operation mode of the DHCPv6 client according to the M flag count and the O flag count in step S160. The first router 200-1 transmits a first RA message to the IPv6 host 100 in step S170.

Here, in the case of an initial access without an IPv6 address, the IPv6 host 200 is assigned with an IPv6 address from the DHCPv6 server according to the operation mode of the DHCPv6 client or generates an IPv6 address by combining prefix information in an option field with a network interface identifier.

The IPv6 host 100 sets the operation mode of the DHCPv6 client as the stateful operation mode when the M flag count is greater than one (1), as the stateless operation mode when the M flag count is zero (0) and the O flag count is greater than one (1) and as the inactive operation mode when both the M flag count and the O flag count are zero (0).

Specifically, the IPv6 host 100 activates the DHCPv6 client when at least one of a plurality of access networks uses the stateful address configuration protocol and stops running the DHCPv6 client when all the access networks use the stateless address configuration protocol.

Accordingly, the IPv6 host 100 may reduce consumption of resources since it is not required to control the operation of the DHCPv6 client whenever RA messages having differently-set M/O flag values are received. Since a process of accessing the DHCPv6 server of an access network due to frequent stopping and reactivation of the DHCPv6 client is not repeated, it is possible to minimize loads on the DHCPv6 server and the network. Furthermore, stable access to a network (Internet) may be enabled by an access network that requires the stateful address configuration protocol.

In addition, the IPv6 host 100 may dynamically control the operation of the DHCPv6 client according to the M/O flag values of the RA messages.

Figure 4:
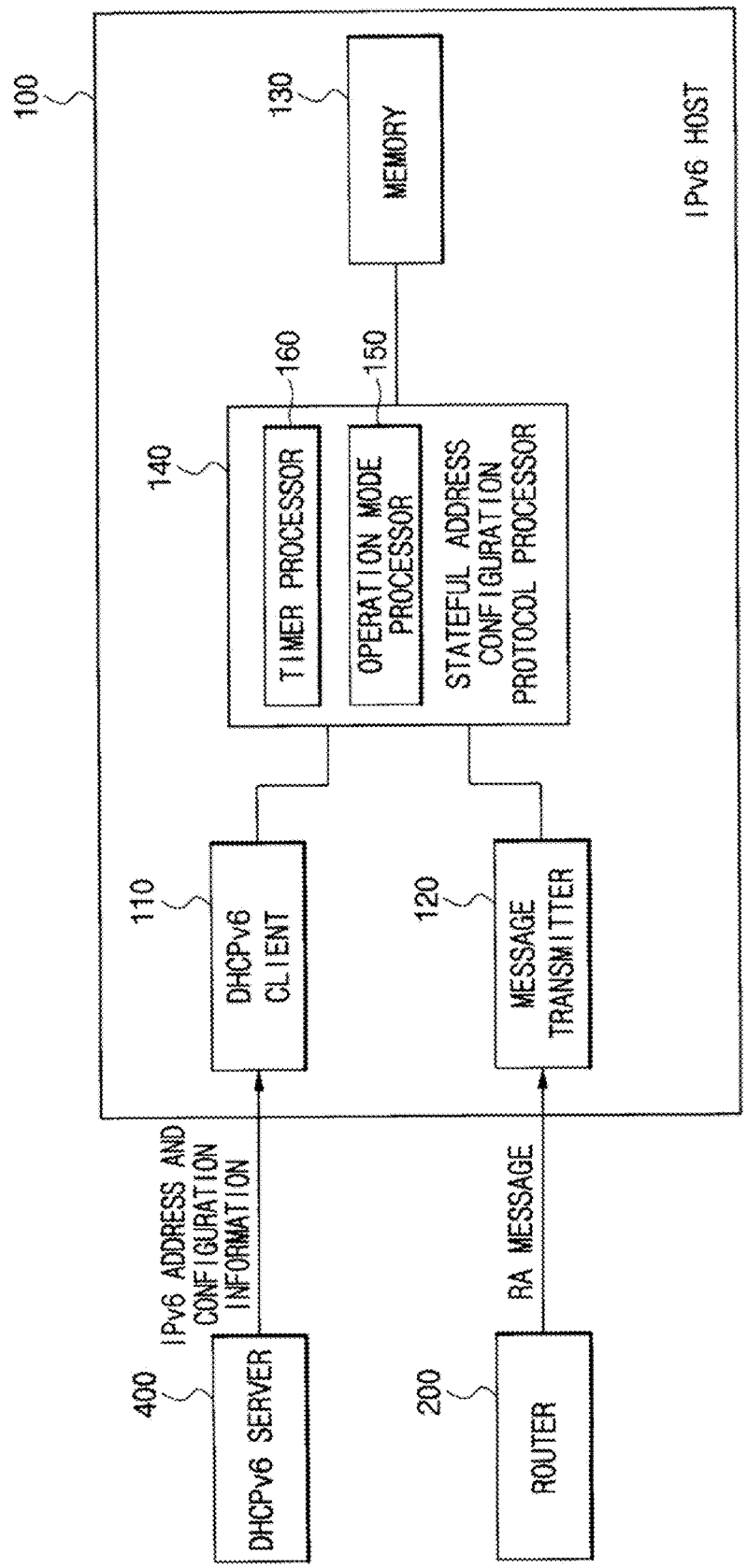
FIG. 4 is a block diagram illustrating an IPv6 host according to an exemplary embodiment of the present invention.

FIG. 4 is a block diagram illustrating the IPv6 host according to an exemplary embodiment of the present invention.

Referring to FIG. 4, the IPv6 host 100 according to an exemplary embodiment of the present invention includes a message transmitter 120, a DHCPv6 client 110, a memory 130 and a stateful address configuration protocol processor 140. The stateful address configuration protocol processor 140 includes an operation mode processor 150 and a timer processor 160.

The message transmitter 120 transmits an RS message from the IPv6 host 100 to one or more routers 200 or receives RA messages from the routers 200.

The DHCPv6 client 110 is activated or stopped according to the operation mode set by the IPv6 host 100. When the IPv6 host 100 sets a stateful operation mode, the DHCPv6 client 110 acquires an IPv6 address and other pieces of configuration information from the DHCPv6 server 400, which is located in an access network.

The DHCPv6 client 110 acquires the other pieces of configuration information except for the IPv6 address from the DHCPv6 server when a stateless operation mode is set. The DHCPv6 client 110 stops running when an inactive operation mode is set. Here, the DHCPv6 110 returns an IPv6 address acquired from the DHCPv6 server 400.

The stateful address configuration protocol processor 140 determines the stateful address configuration operation mode of the IPv6 host 100, i.e., the operation mode of the DHCPv6 client according to previous M/O flag values and present M/O flag values by verifying the M/O flag values of the received RA messages according to the routers 200.

The memory 130 may be implemented with a memory device and stores a flag table in which flag values are managed according to the routers 200.

Specifically, the operation mode processor 150 of the stateful address configuration protocol processor 140 manages the M/O flag values of the received RA messages according to the routers 200.

The operation mode processor 150 uses link local addresses of the routers 200 as identification information. Based on the identification information, the operation mode processor 150 manages the M/O flag values included in the RA messages, received from the corresponding routers 200, in a flag table.

Figure 5:
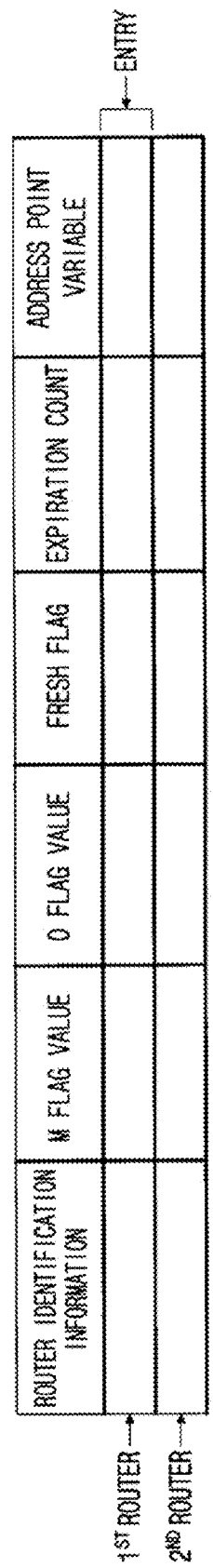
FIG. 5 is a diagram illustrating a flag table, which is managed by an IPv6 host according to an exemplary embodiment of the present invention.

FIG. 5 is a diagram illustrating a flag table, which is managed by an IPv6 host according to an exemplary embodiment of the present invention.

Referring to FIG. 5, the IPv6 host 100 manages M flag values, O flag values, fresh flags, expiration counts and address point variables of RA messages received from the routers 200 according to link local addresses, which are identification information of the routers 200. Here, a fresh flag indicates that a field value of the flag field of a corresponding router 200 is updated in response to an RA message received again from the corresponding router 200. An expiration count is for ending management of M/O flag values of the corresponding router 200. An address point variable indicates a starting point of a flag table field regarding M/O flag values of a next router 200.

Here, the IPv6 host 100 manages the flag values, included in the RA messages according to the routers 200, as one record (entry) unit (RA_FLAG_INFO). More particularly, the IPv6 host 100 manages the flag values according to link local addresses, M/O flag values, fresh flags, expiration counts and address point variables indicating a starting point of a next router.

In addition, the IPv6 host 100 manages record units according to the routers 200 using a flag table (RA_FLAG_INFO_LIST), which includes a list of flags. The IPv6 host 100 thereby manages the flag values according to one or more routers 200, which the IPv6 host 100 accesses via a switch.

In the meantime, when an RA message is received from any one of the routers 200, the operation mode processor 150 determines whether an entry corresponding to the router 200 is present in the flag table.

Specifically, when the RA message is received, the operation mode processor 150 determines whether the entry corresponding to the source address of the RA message (i.e., a link local address of the router 200) is present in the list of the flag table. If there is no entry corresponding to the link local address of the router, the operation mode processor 150 determines whether the M flag value or the O flag value of the RA message is 1 (true).

If the M flag value or the O flag value of the RA message is 1, the operation mode processor 150 generates a new entry corresponding to the router 200 and adds the new entry to the flag table.

The operation mode processor 150 increases an M flag count (M_FLAG_RA_COUNT) by one (1) if the M flag value of the RA message is 1. If the O flag value is 1 (M=0), the operation mode processor 150 increases an O flag count (O_FLAG_RA_COUNT) by one (1).

The M flag count indicates the number of routers 200 from which RA messages with the M flag value set to 1 are transmitted. That is, the M flag count indicates the number of entries of a flag table in which the M flag value is set to 1. The O flag count indicates the number of routers 200 from which the RA messages with the M flag value set to 0 and the O flag value set to 1 are transmitted. That is, the O flag count indicates the number of entries of a flag table in which the M flag value is 0 and the O flag value is 1.

In addition, if existing entries corresponding to the routers 200, which transmitted the RA messages, are present, the operation mode processor 150 compares the M/O flag values stored in the existing entries with the M/O flag values of the received RA messages.

Table 1 below explains a method of processing an M or O flag count by comparing existing entry information with flag values in a received RA message.

TABLE 1

| Case No. | Flag values of existing entry | Flag values of RA message | |
|---|---|---|---|
| 1 | M = 1 (O = don't care) | M = 0, O = 1 | M_FLAG_RA_COUNT increased by 1, O_FLAG_RA-COUNT increased by 1, Flag information of entry updated (refreshed) |
| 2 | | M = 0, O = 0 | M_FLAG_RA_COUNT decreased by 1, Entry canceled |
| 3 | M = 0, O = 1 | M = 1 (O = don't care) | M_FLAG_RA_COUNT increased by 1, O_FLAG_RA-COUNT decreased by 1, Flag information of entry updated |
| 4 | | M = 0, O = 1 | O_FLAG_RA-COUNT decreased by 1, Entry canceled |

In four (4) cases reported in Table 1 above, an M flag count or an O flag count is processed based on whether an M flag value or an O flag value is changed. In other cases, a fresh flag is verified based on whether an RA message with a fixed M flag value or O flag value is received from a corresponding router 200. Thus, a field value of a flag table is updated.

Among the M flag value and the O flag value in the RA message received from the router 200, the IPv6 host 100 processes the M flag value prior to the O flag value. In other words, the IPv6 host 100 activates the DHCPv6 client 110 irrespective of the O flag value when the M flag value is 1, since the IPv6 host 100 is required to access the DHCPv6 server 400 by activating the DHCPv6 client 110 when the M flag value of the RA message is 0.

The operation mode processor 150 determines the operation mode of the DHCPv6 client 110 according to a change in the M flag count and the O flag count. The operation mode determination is described as follows.

The operation mode processor 150 activates the DHCPv6 client 110 by determining the operation mode of the DHCPv6 client 110 as a stateful operation mode when an M flag count is changed from 0 to 1. Specifically, when an RA message with an M flag set to 1 (true) is received in the state where there are no routers 200 which transmitted the RA message with an M flag set to 1, the operation mode processor 150 activates the DHCPv6 client 110 in the stateful operation mode. If the M flag count is not changed from 1 to 0, the operation mode processor 150 continues to run the DHCPv6 client 110.

The operation mode processor 150 activates the DHCPv6 client 110 by determining the operation mode of the DHCPv6 client 110 as a stateless operation mode when an M flag count is 0 and an O flag count is not 0. Specifically, when an RA message with an M flag set to 1 is not received and an RA message with an O flag set to 1 is received, the operation mode processor 150 activates the DHCPv6 client 110 in the stateless operation mode. If the M flag count is 0 and the O flag count is not 0, the operation mode processor 150 continues to run the DHCPv6 client 110. Here, the IPv6 host 100 allows the DHCPv6 110 to return an IPv6 address acquired from the DHCPv6 server 400.

In addition, the operation mode processor 150 determines the operation mode of the DHCPv6 client 110 as an inactive operation mode and stops running the DHCPv6 client 110 when both the M flag count and the O flag count are 0. Specifically, when an RA message with both the M flag value and the O flag value set to 1 is not received, the operation mode processor 150 stops running the DHCPv6 client 110. Here, the operation mode processor 150 returns an IPv6 address acquired from the DHCPv6 server 400.

In other words, when there are one or more routers 200 that transmit an RA message with an M flag value set to 1, the operation mode processor 150 determines the operation mode of the DHCPv6 client 110 as the stateful operation mode and activates the DHCPv6 client 110 to acquire an IPv6 address and other pieces of configuration information from the DHCPv6 server 400.

When there are no routers 200 that transmit an RA message with an M flag value set to 1 and there are one or more routers 200 that transmit an RA message with an O flag value set to 1, the operation mode processor 150 determines the operation mode of the DHCPv6 client 110 as the stateless operation mode and activates the DHCPv6 client 110 to acquire the other pieces of configuration information except for the IPv6 address from the DHCPv6 server 400.

In addition, when there are no routers 200 that transmit an RA message with an M flag value or an O flag value set to 1, the operation mode processor 150 determines the operation mode of the DHCPv6 client 110 as the inactive mode and stops running the DHCPv6 client 110.

The timer processor 160 of the stateful address configuration protocol processor 140 activates a timer such that entries listed in the flag table according to the routers 200 may be refreshed by an RA message received again from the corresponding router 200.

Since the periodicity of an RA message transmitted from each router 200 is not acquirable, the IPv6 host 100 periodically multicasts an RS message requesting the RA message in order to detect an event where the corresponding router 200 stops a service or an event where a link to the router 200 is disconnected.

The timer processor 160 activates a first timer (RA_FLAG_ INFO_LIST_REFRESH_TIMER) for transmitting an RS message. When the first timer expires, the timer processor 160 allows the IPv6 host 100 to multicast the RS message.

After the RS message is multicast, when an RA message is received before refresh timeout (RA_FLAG_INFO_LIST_REFRESH_TIMEOUT), the IPv6 host 100 refreshes entry information of a corresponding router 200. When the RA message is not received before the refresh timeout, the IPv6 host 100 increases an expiration count of the router 200 by one (1).

When the expiration count of the entries of the flag table (RA_FLAG_INFO) becomes substantially the same as a maximum expiration count (MAX_RA_FLAG_INFO_EXPIRE_COUNT) (e.g., 3), the IPv6 host 100 cancels the entry of the corresponding router 200 since the router 200 did not transmit an RA message due to, for example, an end of service.

When the link is disconnected, the IPv6 host 100 cancels the entry of flag table and stops running the first timer (RA_FLAG_INFO_LIST_REFRESH_TIMER).

When the link is reconnected, the IPv6 host 100 multicasts an RS message to the routers 200, receives RA messages from the routers 200 and constructs a flag table by generating entries according to the routers 200. The timer processor 160 then activates the first timer.

As a result, the IPv6 host 100 maximizes storage efficiency of the memory 130 by generating and canceling the entries of the flag table according to the routers 200.

Figure 6:
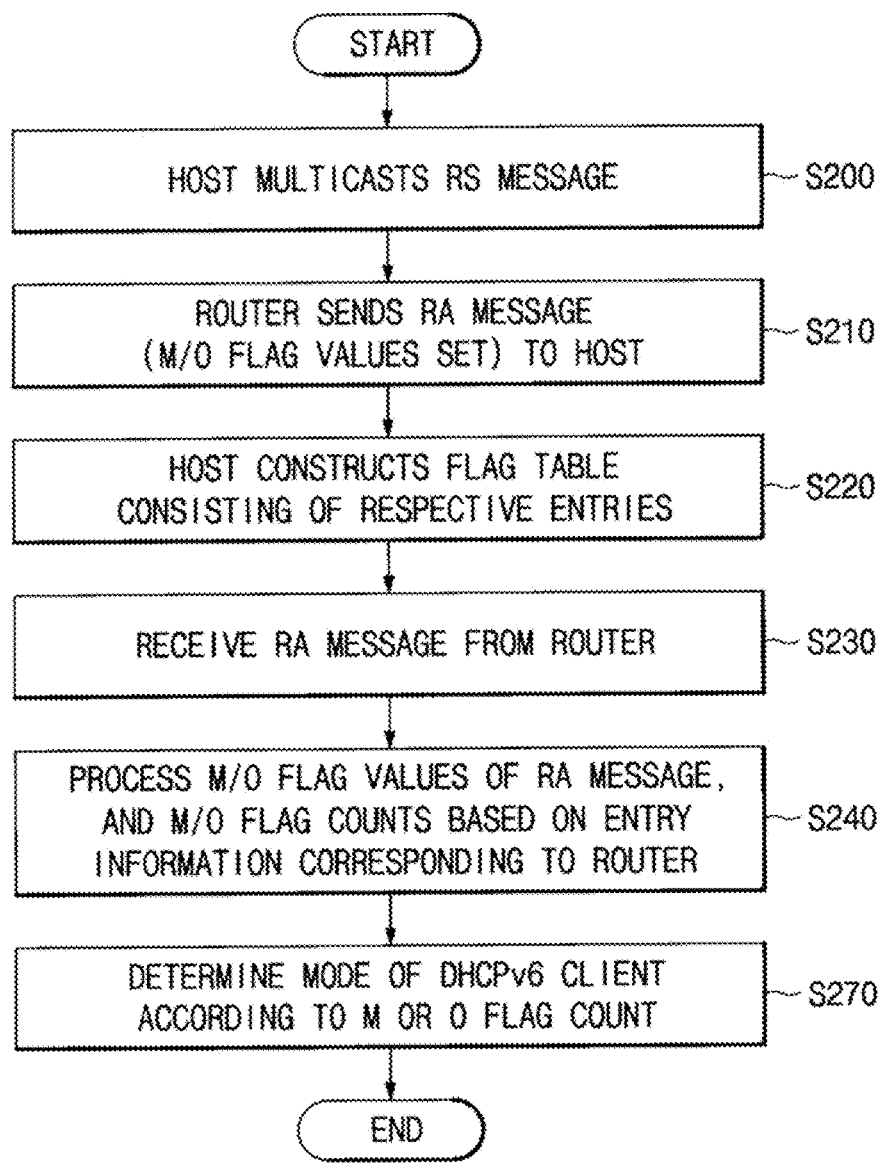
FIG. 6 is a flowchart illustrating a method for processing a stateful address configuration protocol in an IPv6 network according to an exemplary embodiment of the present invention.

FIG. 6 is a flowchart illustrating a method for processing a stateful address configuration protocol in an IPv6 network according to an exemplary embodiment of the present invention.

Referring to FIG. 6, when the IPv6 host 100 is connected to the IPv6 network, the IPv6 host 100 multicasts an RS message in step S200.

Periodically or when the RS message is received, the routers 200 transmit an RA message having an M flag value and an O flag value to the IPv6 host 100 in step S210. Here, the M flag value and the O flag value are set according to network protocols.

The IPv6 host 100 constructs a flag table, which is a list of entries according to the routers 200 in step S220.

The IPv6 host 100 manages the flag table in entry units, such as a link local address, a flag value (M/O flags), a fresh flag, an expiration count and an IPv6 address point variable from which a next record starts.

When the RA message is received from any one of the routers 200 in step S230, the IPv6 host 100 processes M/O flag values of the RA message and an M flag count and an O flag count in step S240. Here, the M flag count and the O flag count are processed based on entry information corresponding to the router 200.

Figure 7A:
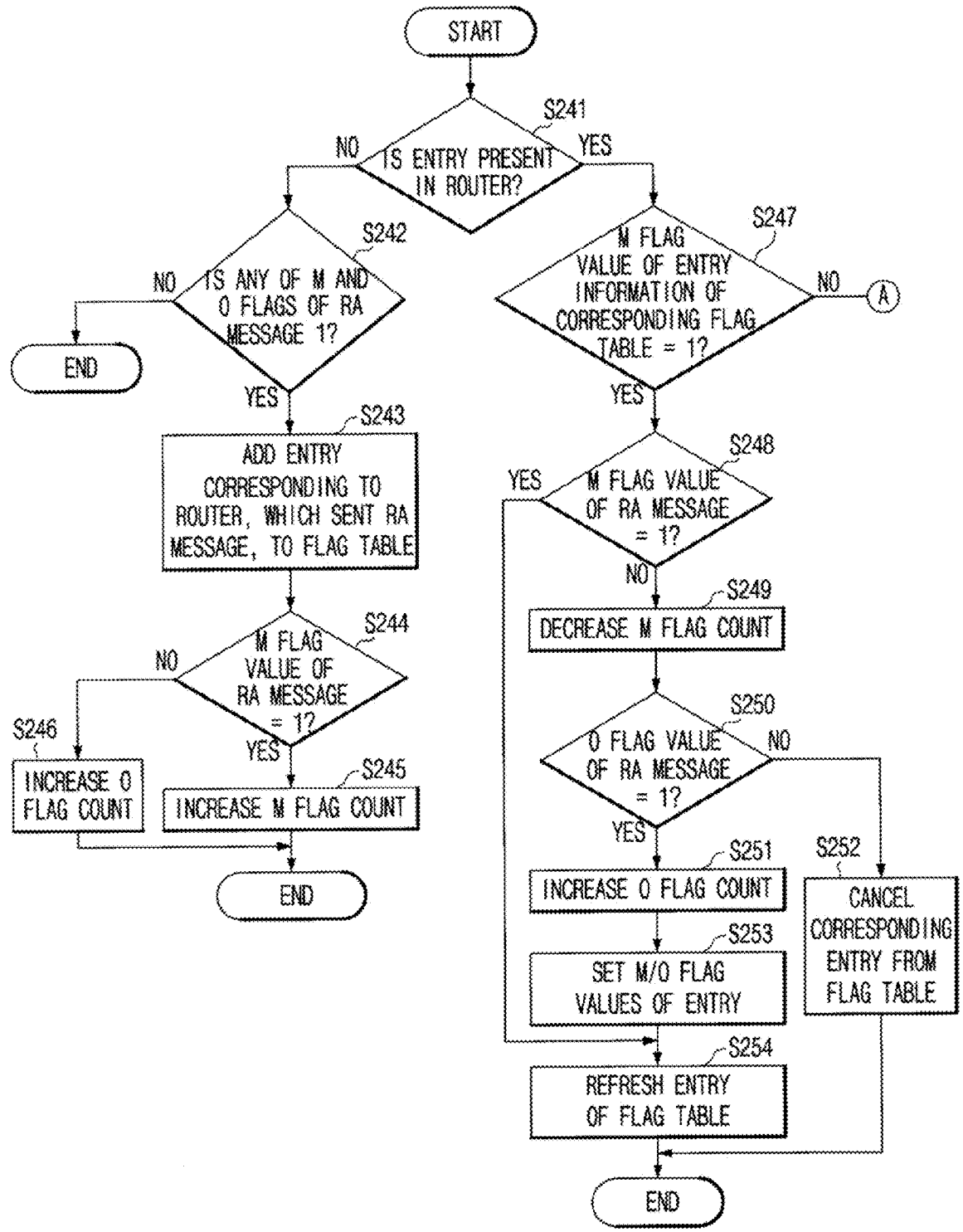
FIGS. 7A and 7B are flowcharts illustrating a method in which an IPv6 host message according to an exemplary embodiment of the present invention processes a flag count after an RA is received.
Figure 7B:
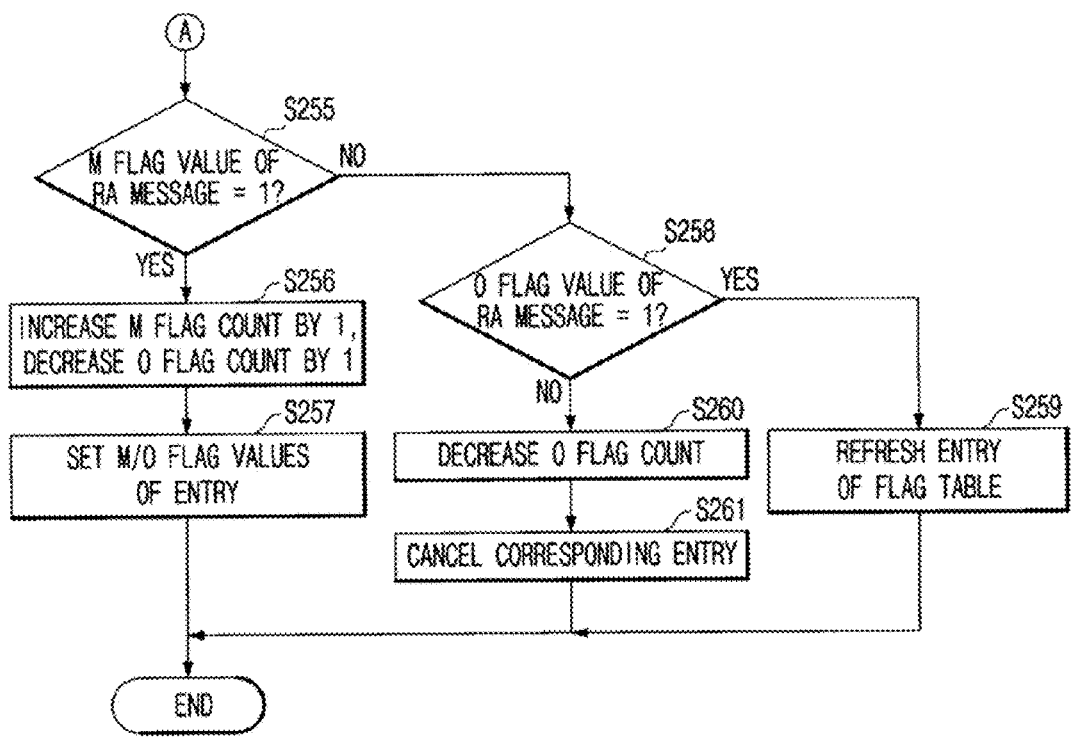

FIGS. 7A and 7B are flowcharts illustrating a method in which an IPv6 host according to an exemplary embodiment of the present invention processes a flag count after an RA message is received.

Referring to FIG. 7A, when an RA message is received from any one of the routers 200, the IPv6 host 100 determines whether there is an entry corresponding to a link local address of the router 200 in step S241.

If an entry corresponding to the router 200, which transmitted the RA message, is not present, the IPv6 host 100 determines whether at least one of the M flag and the O flag of the RA message is true (1) in step S242.

If both the M flag and the O flag of the RA message are false (0), the IPv6 host 100 holds the operation mode of the DHCPv6 client 110 as a previous mode.

If at least one of the M flag and the O flag of the RA message is true (1), the IPv6 host 100 adds an entry corresponding to the router 200, which transmitted the RA message, to a flag table in step S243.

The IPv6 host 100 determines whether an M flag value of the RA message received from the router 200 is 1 in step S244. If the M flag value is 1, the IPv6 host 100 sets the M flag value of the entry of the router 200 to 1 and increases an M flag count by 1 in step S245.

If the M flag of the RA message is 0 and the O flag of the RA message is 1, the IPv6 host 100 sets the O flag value of the entry of the router 200 to 1 and increases an O flag count by 1 in step S246.

In the meantime, as the result of step S241, if there is an entry corresponding to the router 200, which transmitted the RA message, the IPv6 host determines whether an M flag value of entry information of a corresponding flag table is 1 in step S247. Specifically, the IPv6 host 100 verifies previous entry information of the router 200.

If the M flag value of the entry information of the flag table is 1, the IPv6 host 100 determines whether the M flag value of the RA message is 1 in step S248.

If the M flag value of the RA message is 0, the IPv6 host 100 decreases the M flag count by 1 in step S249. Since the network protocol of an access network connected with the router 200, which transmitted the RA message, is changed from a previous stateful address configuration protocol (M flag=1) to a stateless address configuration protocol (M flag=0), the IPv6 host 100 decreases the M flag count by 1.

The IPv6 host 100 determines whether the O flag value of the RA message is 1 in step S250. The IPv6 host 100 increases the O flag count by 1 if the O flag value is 1 in step S251 and cancels a corresponding entry from the flag table if the O flag count is 0 in step S252. In other words, the IPv6 host 100 cancels the entry corresponding to the router 200 from the flag table since managing the M flag value and the O flag value of the router 200 is not required if both the M flag value and the O flag value of the RA message are 0.

Subsequent to step S251, the IPv6 host 100 increases the O flag count by 1 and sets the M flag value and the O flag value of the flag entry corresponding to the router 200 in step S253.

In addition, the IPv6 host 100 refreshes the entry of the flag table corresponding to the router 200 and sets fresh fields in step S254.

Referring to FIG. 7B, as the result of step S247, if the M flag value of entry information corresponding to the router 200, which transmitted the RA message, is 0, the IPv6 host 100 determines whether the M flag value of the RA message is 1 in step S255.

If the M flag value of the RA message is 1, the IPv6 host increases the M flag count by 1 and decreases the O flag count by 1 in step S256.

The IPv6 host 100 sets the M flag value and the O flag value of the flag entry corresponding to the router 200 in step S257.

In the meantime, if the M flag value of the RA message is 0 as the result of step S255, the IPv6 host 100 determines whether the O flag value of the RA message is 1 in step S258.

If the O flag value is 1, the IPv6 host 100 refreshes the entry of the flag table corresponding to the router 200 and sets up a fresh field in step S259.

However, if the O flag value is 0, the IPv6 host 100 decreases the O flag value by 1 in step S260.

In addition, the IPv6 host 100 cancels the entry of the router 200 since both the M flag value and the O flag value of the RA message are 0 in step S261.

Returning to FIG. 6, the IPv6 host 100 processes the M flag count or the O flag count according to the received RA message, determines the operation mode of the DHCPv6 client 110 according to the M flag count or the O flag count, and acquires an IPv6 address or other pieces of configuration information from the DHCPv6 server 400 in step S270.

In other words, when there is a change in the M flag count and the O flag count, the IPv6 host 100 determines the operation mode of the DHCPv6 client 110 based on the M flag count and the O flag count.

Figure 8:
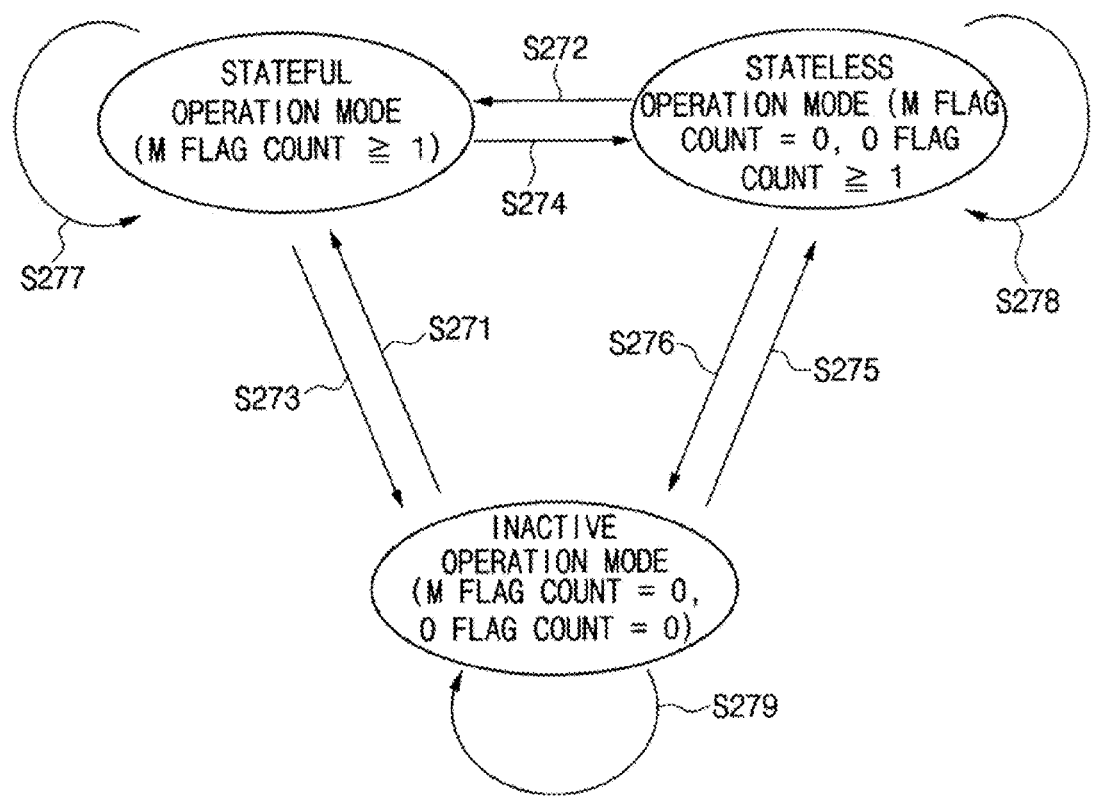
FIG. 8 is a mode transition diagram illustrating a method in which an IPv6 host according to an exemplary embodiment of the present invention processes an operation mode of a DHCPv6 client.

FIG. 8 is a mode transition diagram illustrating a method in which an IPv6 host according to an exemplary embodiment of the present invention processes an operation mode of a DHCPv6 client.

Referring to FIG. 8, when there is a change in an M flag count or an O flag count, the IPv6 host 100 determines a new operation mode of the DHCPv6 client 110 based on the changed M flag count or O flag count.

The IPv6 host 100 determines the operation mode of the DHCPv6 client 110 as a stateful operation mode if the M flag count is 1 or greater, as a stateless operation mode if the M flag count is 0 and the O flag count is 1 or greater, and as an inactive operation mode if both the M flag count and the O flag count are 0.

If there is a change in the M flag count and the O flag count in a previous operation mode of the DHCPv6 client, the IPv6 host 100 determines a new operation mode and determines whether to change the previous operation mode into the new operation mode.

In the case of changing from the inactive operation mode into the stateful operation mode, that is, when the M flag count is increased by 1 from 0 but the O flag count remains 0, the IPv6 host 100 determines the operation mode of the DHCPv6 client 110 as the stateful operation mode and activates the DHCPv6 client 110 in step S271.

In the case of changing from the stateless operation mode into the stateful operation mode, that is, when the M flag count is increased by 1 from 0 and the O flag count remains 1 or greater, the IPv6 host 100 determines the operation mode of the DHCPv6 client 110 as the stateful operation mode and changes the operation mode of the DHCPv6 client 110 in step S272.

In the case of changing from the stateful operation mode into the inactive operation mode, that is, when the M flag count is decreased from 1 to 0 and the O flag count remains 0, the IPv6 host 100 determines the operation mode of the DHCPv6 client 110 as the inactive operation mode and stops running the DHCPv6 client 110 in step S273.

Here, the DHCPv6 client 110 of the IPv6 host 100 returns an IPv6 address, which was acquired from the DHCPv6 server 400 in the stateful operation mode.

In the case of changing from the stateful operation mode into the stateless operation mode, that is, when the M flag count is decreased from 1 to 0 and the O flag count is 1 or greater, the IPv6 host 100 determines the operation mode of the DHCPv6 client 110 as the stateless operation mode and changes the operation mode of the DHCPv6 client 110 in step S274.

Here, the DHCPv6 client 110 of the IPv6 host 100 returns an IPv6 address, which was acquired from the DHCPv6 server 400 in the stateful operation mode.

In the case of changing from the inactive operation mode into the stateless operation mode, that is, when the M flag count remains 0 and the O flag count is increased by 1 from 0, the IPv6 host 100 determines the operation mode of the DHCPv6 client 110 as the stateless operation mode and activates the DHCPv6 client 110 in step S275.

In the case of changing from the stateless operation mode into the inactive operation mode, that is, when the M flag count remains 0 and the O flag count is decreased from 1 to 0, the IPv6 host 100 determines the operation mode of the DHCPv6 client 110 as the inactive operation mode and stops running the DHCPv6 client 110 in step S276.

When a new operation mode, determined by changing the M flag count or the O flag count, is the same as a previous operation mode, the IPv6 host 100 maintains the operation mode of the DHCPv6 client 110 in steps S277, S278 and S279.

Specifically, when the M flag count increases from 1 to 2, the IPv6 host 100 determines the operation mode of the DHCPv6 client 110 as the stateful operation mode. Since the previous operation mode of the DHCPv6 client 110 is the stateful operation mode, the IPv6 host 100 maintains the stateful operation mode.

In addition, when the M flag count remains 0 and the O flag count is increased from 1 to 2, the IPv6 host 100 determines the operation mode of the DHCPv6 client 110 as the stateless operation mode. Since the previous operation mode of the DHCPv6 client 110 is the stateless operation mode, the IPv6 host 100 maintains the stateless operation mode.

Accordingly, the IPv6 host 100 may operate the DHCPv6 client 110 according to the M/O flag values of the RA message received from the router 100. In addition, the IPv6 host 100 does not repeatedly activate or stop the DHCPv6 client 110, even if the RA message is received from a plurality of routers 200 connected to a plurality of access networks to which different network protocols are set.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for processing a stateful address auto-configuration protocol in an Internet Protocol version 6 (IPv6) network, the method comprising:
   multicasting, at an IPv6 host, a Router Solicitation (RS) message;
   acquiring and managing flag values of a Router Advertisement (RA) message received from at least one router; and
   setting an operation mode of a Dynamic Host Configuration Protocol-for-IPv6 (DHCPv6) client according to the flag values of the RA message,
   wherein the acquiring and the managing of the flag values comprises:
   constructing a flag table comprising entries according to the router,
   if one an M flag value and an O flag value of the RA message is true, determining whether an entry corresponding to the router is present in the flag table,
   if the entry corresponding to the router is not present, adding the corresponding entry to the flag table, and
   if the entry corresponding to the router is present, processing one of a first flag count and a second flag count based on information on the corresponding entry and one of the M flag value and the O flag value of the RA message.

2. The method according to claim 1, wherein the acquiring and the managing of the flag values comprises acquiring one of the M flag value and the O flag value of the RA message received from the router and managing the RA message according to the router.

3. The method according to claim 1, wherein the acquiring and the managing of the flag values comprises managing one of the M flag value and the O flag value of the RA message received from the router according to a link local address of the router.

4. The method according to claim 1, wherein the acquiring and the managing of the flag values comprises:
   acquiring one of the M flag value and the O flag value of the RA message;
   increasing a first flag count if the M flag value is true; and
   increasing a second flag count if the O flag value is true.

5. The method according to claim 4, wherein the acquiring and the managing of the flag values comprises:
   acquiring a previous M flag value of a previous RA message received from the router;
   decreasing the first flag count if the previous M flag value is true and the M flag value is false; and
   increasing the first flag count if the previous M flag value is false and the M flag value is true.

6. The method according to claim 4, wherein the acquiring and the managing of the flag values comprises:
- acquiring a previous O flag value of a previous RA message received from the router; and
- increasing the second flag count if the previous O flag value is false and the O flag value is true.

7. The method according to claim 1, wherein the processing of one of the first flag count and the second flag count comprises:
- decreasing the first flag count if an M flag value of the corresponding entry is true and the M flag value of the RA message is true;
- increasing the first flag count if the M flag value of the corresponding entry is false and the M flag value of the RA message is true; and
- increasing the second flag count if an O flag value of the corresponding entry is false and the O flag value of the RA message is true.

8. The method according to claim 1, further comprising:
- if one of the M flag value and the O flag value of the RA message is true, refreshing the corresponding entry using one of the true M flag value and the true O flag value; and
- if one of the M flag value and the O flag value of the RA message is false, canceling the corresponding entry.

9. The method according to claim 1, wherein the flag table is constructed in entry units, which comprise at least one field according to the router, selected from a group comprising a link local address, an M flag value, an O flag value, a fresh flag, an expiration count and a starting address point variable of a next entry.

10. The method according to claim 9, further comprising:
- multicasting, at the IPv6 host, the RS message by activating a timer;
- setting up the fresh flag if the RA message is received from a preset router before timeout;
- increasing the expiration count flag if the RA message is not received from the preset router before timeout; and
- canceling the entry corresponding to the preset router if the expiration count exceeds a maximum expiration count.

11. The method according to claim 1, wherein the operation mode of the DHCPv6 client is set, according to one of the M flag value and the O flag value of the RA message, as one of a first operation mode for acquiring an IPv6 address and configuration information from a DHCPv6 server, a second operation mode for acquiring the configuration information except for the IPv6 address from the DHCPv6 server and a third operation mode for stopping running the DHCPv6 client.

12. The method according to claim 11, wherein the setting of the operation mode of the DHCPv6 client comprises:
- verifying the first flag count and the second flag count;
- setting the first operation mode if the first flag count is greater than 1;
- setting the second operation mode if the first flag count is 0 and the second flag count is greater than 1; and
- setting the third operation mode if both the first flag count and the second flag count are 0.

13. A method for processing a stateful address auto-configuration protocol in an Internet Protocol version 6 (IPv6) network, the method comprising:
- acquiring, at an IPv6 host, one of an M flag value and an O flag value of a Router Advertisement (RA) message received from a router;
- processing one of a first flag count and a second flag count based on one of the M flag value and the O flag value of the RA message and one of a previous M flag value and a previous O flag value of a previous RA message from the router; and
- setting an operation mode of a Dynamic Host Configuration Protocol-for-IPv6 (DHCPv6) based on one of the first flag count and the second flag count,
wherein the processing of one of the first flag count and the second flag count comprises:
- decreasing the first flag count if the previous M flag value is true and the M flag value of the RA message is true,
- increasing the first flag count if the previous M flag value is false and the M flag value of the RA message is true, and
- increasing the second flag count if the previous O flag value is false and the O flag value of the RA message is true.

14. The method according to claim 13, wherein the processing of one of the first flag count and the second flag count comprises:
- constructing a flag table comprising of entry units of the router, which comprise at least one field of the router selected from a group comprising a link local address, an M flag value, an O flag value, a fresh flag, an expiration count and a starting address point variable of a next entry;
- when the RA message is received, determining whether an entry comprising a link local address corresponding to a source address is present in the flag table;
- if the entry corresponding to the source address is not present and if one of the M flag value and the O flag value of the RA message is true, adding a new entry; and
- if the entry corresponding to the source address is present, comparing one of the previous M flag value and the previous O flag value of the entry with one of the M flag value and the O flag value of the RA message.

15. The method according to claim 14, wherein the comparing of one of the previous M flag value and the previous O flag value of the entry with one of the M flag value and the O flag value of the RA message comprises:
- decreasing the first flag count if the previous M flag value is true and the M flag value is false;
- increasing the second flag count and refreshing the M flag value and the O flag value in the entry if the O flag value is true;
- canceling the entry if the O flag value is false.

16. The method according to claim 15, further comprising:
- increasing the first flag count and decreasing the second flag count if the previous M flag value is false and the M flag value is true;
- refreshing the M flag value and the O flag value in the entry; and
- decreasing the second flag count and canceling the entry if both the M flag value and the O flag value are false.

17. The method according to claim 15, further comprising:
- increasing the second flag count and refreshing the M flag value and the O flag value in the entry if the previous O flag value is false and the O flag value is true; and
- increasing the first flag count and refreshing the M flag value and the O flag value in the entry if the M flag value is true and the M flag value is true.

18. The method according to claim 14, further comprising:
- refreshing the entry and setting up the fresh flag, if one of the M flag value and the O flag value of the RA message is true;
- canceling the entry, if both the previous M flag value and the previous O flag value are false;

increasing the expiration count, if the RA message, in response to a Router Solicitation (RS) message transmitted by operation of a timer, is not received before timeout; and canceling the entry if the expiration count exceeds a maximum expiration count.

19. The method according to claim 14, further comprising:
canceling the flag table if a link of the IPv6 host is one of disconnected and terminated; and
constructing the flag table according to the M flag value and the O flag value of the RA message received from the router if the link is reconnected.

20. The method according to claim 13, wherein the setting of the operation mode of the DHCPv6 comprises:
verifying the first flag count and the second flag count;
setting the operation mode as a first operation mode if the first flag count is greater than 1, the first operation mode acquiring an IPv6 address and configuration information from a DHCPv6 server;
setting the operation mode as a second operation mode if the first flag count is 0 and the second flag count is greater than 1, the second operation mode acquiring the configuration information except for the IPv6 address from the DHCPv6 server; and
setting the operation mode as a third operation mode if both the first flag count and the second flag count are 0, the third operation mode stops running the DHCPv6 client.

21. An Internet protocol version 6 (IPv6) network comprising:
at least one router providing a Router Advertisement (RA) message with one of an M flag value and an O flag value set according to a network protocol; and
at least one host acquiring one of the M flag value and the O flag value of the RA message received from the router, managing one of the M flag value and the O flag value according to the router, and determining a stateful address configuration operation mode of a Dynamic Host Configuration Protocol-for-IPv6 (DHCPv6) client based on one of the M flag value and the O flag value of the router,
wherein, if one of the M flag value and the O flag value of the RA message is true, the host determines whether an entry corresponding to the router is present in the flag table, if the entry corresponding to the router is not present, the host adds the corresponding entry to the flag table, and if the entry corresponding to the router is present, the host processes one of a first flag count and a second flag count based on information on the corresponding entry and one of the M flag value and the O flag value of the RA message.

22. The IPv6 network according to claim 21, wherein the host constructs a flag table comprising entries of the router and manages one of the M flag value and the O flag value of the RA message according to the router.

23. The IPv6 network according to claim 22, wherein the host decreases the first flag count if an M flag value of the corresponding entry is true and the M flag value of the RA message is true, the host increases the first flag count if the M flag value of the corresponding entry is false and the M flag value of the RA message is true, and the host increases the second flag count if an O flag value of the corresponding entry is false and the O flag value of the RA message is true.

24. The IPv6 network according to claim 23, wherein the host sets the stateful address configuration operation mode as a first operation mode if the first flag count is greater than 1, the first operation mode acquiring an IPv6 address and configuration information from a DHCPv6 server, as a second operation mode if the first flag count is 0 and the second flag count is greater than 1, the second operation mode acquiring the configuration information except for the IPv6 address from the DHCPv6 server, and as a third operation mode if both the first flag count and the second flag count are 0, the third operation mode stops running the DHCPv6 client.

25. The IPv6 network according to claim 21, wherein the flag table is constructed in entry units according to the router, which comprise at least one field selected from a group comprising a link local address, an M flag value, an O flag value, a fresh flag, an expiration count and a starting address point variable of a next entry.

26. The IPv6 network according to claim 25, wherein the host multicasts the RS message by activating a timer, sets up the fresh flag if the RA message is received from the router before timeout, increases an expiration count flag if the RA message is not received from the router before timeout, and cancels the entry of the router if the expiration count exceeds a maximum expiration count.

27. An Internet protocol version 6 (IPv6) host comprising:
a message transmitter for transmitting a Router Solicitation (RS) message to a network and for receiving a Router Advertisement (RA) message from at least one router;
a Dynamic Host Configuration Protocol-for-IPv6 (DHCPv6) client for at least one of acquiring address information and setting information from a DHCPv6 server according to a stateful address configuration operation mode;
a stateful address configuration protocol processor acquiring one of an M flag value and an O flag value of the RA message received from the router, managing one of the M flag value and the O flag value according to the router using a flag table, and determining an operation mode of the DHCPv6 client based on a previous M flag value and a previous O flag value of the router in the flag table and the M flag value and the O flag value of the RA message; and
a memory for storing the flag table,
wherein the stateful address configuration protocol processor comprises an operation mode processor determining the operation mode based on the previous M flag value and the O flag value in the flag table and the M flag value and the O flag value of the RA message, and
wherein the operation mode processor increases the first flag count if the previous M flag value is false and the M flag value of the RA message is true, decreases the first flag count if the previous M flag value is true and the M flag value of the RA message is false, and increases the second flag count if the previous O flag value is false and the O flag value of the RA message true.

28. The IPv6 host according to claim 27, wherein the operation mode processor verifies the first flag count and the second flag count, sets the operation mode as a first operation mode if the first flag count is greater than 1, the first operation mode acquiring an IPv6 address and configuration information from a DHCPv6 server, sets the operation mode as a second operation mode if the first flag count is 0 and the second flag count is greater than 1, the second operation mode acquiring the configuration information except for the IPv6 address from the DHCPv6 server, and sets the operation mode as a third operation mode if both the first flag count and the second flag count are 0, the third operation mode stops running the DHCPv6 client.

29. The IPv6 host according to claim 27, wherein the flag table is constructed in entry units according to the router, which comprise at least one field selected from a group comprising a link local address, an M flag value, an O flag value, a fresh flag, an expiration count and a starting address point variable of a next entry.

30. The IPv6 host according to claim 29, wherein the operation mode processor adds an entry corresponding to the router to the flag table if an entry corresponding to the source address of the RA message is not present in the flag table and one of the M flag value and the O flag value is true.

31. The IPv6 host according to claim 30, wherein the operation mode processor refreshes one of the M flag value and the O flag value of the RA message in a field corresponding to the flag table and sets up the fresh flag if the entry corresponding to the source address of the RA message is present in the flag table.

32. The IPv6 host according to claim 31, wherein the operation mode processor periodically transmit the RS message to the router or increases the expiration count if the RA message is not received before timeout, when the previous M flag value and the previous O flag value are 0, and cancels the corresponding entry if the expiration count exceeds a maximum expiration count.

33. The IPv6 host according to claim 27, wherein the stateful address configuration protocol processor comprises a timer processor activating a timer that allows the IPv6 host to periodically transmit the RS message.

* * * * *